(12) United States Patent
Huennekens et al.

(10) Patent No.: US 9,334,007 B2
(45) Date of Patent: May 10, 2016

(54) BICYCLE INCLUDING FRAME WITH INFLATABLE SEGMENTS

(71) Applicant: Ford Global Technologies, LLC, Dearborn, MI (US)

(72) Inventors: Johannes Huennekens, Ocean Grove (AU); Lauri Mikael Ohra-aho, Lara (AU); Samuel Ellis, Herne Hill (AU); Greg Foletta, Anakie (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/271,900

(22) Filed: May 7, 2014

(65) Prior Publication Data

US 2015/0321720 A1  Nov. 12, 2015

(51) Int. Cl.
*B62K 3/02* (2006.01)
*B62K 15/00* (2006.01)
*B62K 19/00* (2006.01)

(52) U.S. Cl.
CPC . *B62K 3/02* (2013.01); *B62K 15/00* (2013.01); *B62K 19/00* (2013.01); *Y10T 29/49119* (2015.01); *Y10T 29/49828* (2015.01)

(58) Field of Classification Search
CPC .............................. B62K 15/006; B62K 15/00
USPC ........... 280/274, 275, 278, 281.1, 288, 288.3, 280/283
See application file for complete search history.

(56) References Cited

U.S. PATENT DOCUMENTS

| | | | | |
|---|---|---|---|---|
| 1,016,042 | A | * | 1/1912 | Shelton ........................ 280/284 |
| 1,584,953 | A | * | 5/1926 | Learmont ...................... 303/10 |
| 2,663,278 | A | * | 12/1953 | Skinner .......................... 440/26 |
| 2,748,532 | A | * | 6/1956 | Gergovich et al. ........... 446/404 |
| 4,395,237 | A | * | 7/1983 | Watanabe ....................... 440/27 |
| 5,143,390 | A | * | 9/1992 | Goldsmith ................... 280/201 |
| 5,403,028 | A | * | 4/1995 | Trimble ....................... 280/284 |
| 5,769,442 | A | | 6/1998 | Robinson et al. |
| 6,979,013 | B2 | | 12/2005 | Chen |
| 7,651,110 | B2 | | 1/2010 | Davis et al. |
| 2009/0205893 | A1 | | 8/2009 | Pang |
| 2010/0264622 | A1 | * | 10/2010 | Bastianen .................. 280/281.1 |

FOREIGN PATENT DOCUMENTS

| | | |
|---|---|---|
| AU | 668342 | 4/1996 |
| CN | 2734604 | 10/2005 |
| CN | 2825435 Y | 10/2006 |
| CN | 202368741 U | 8/2012 |
| CN | 202449118 U | 9/2012 |
| EP | 2176117 B1 | 3/2011 |
| KR | 20150042599 | 4/2015 |
| WO | WO 2005057069 | 6/2005 |
| WO | WO 2013029788 | 3/2013 |

OTHER PUBLICATIONS

GB Search Report dated Nov. 26, 2015 (3 pages).

* cited by examiner

*Primary Examiner* — Jacob Knutson
(74) *Attorney, Agent, or Firm* — Frank MacKenzie; Bejin Bieneman PLC

(57) ABSTRACT

A bicycle includes a frame, a front steering assembly rotatably coupled to the frame, a front wheel rotatably coupled to the front steering assembly, and a rear wheel rotatably coupled to the frame. The frame includes an inflatable segment and a valve in communication with the inflatable segment for selectively inflating and deflating the inflatable segment.

20 Claims, 6 Drawing Sheets

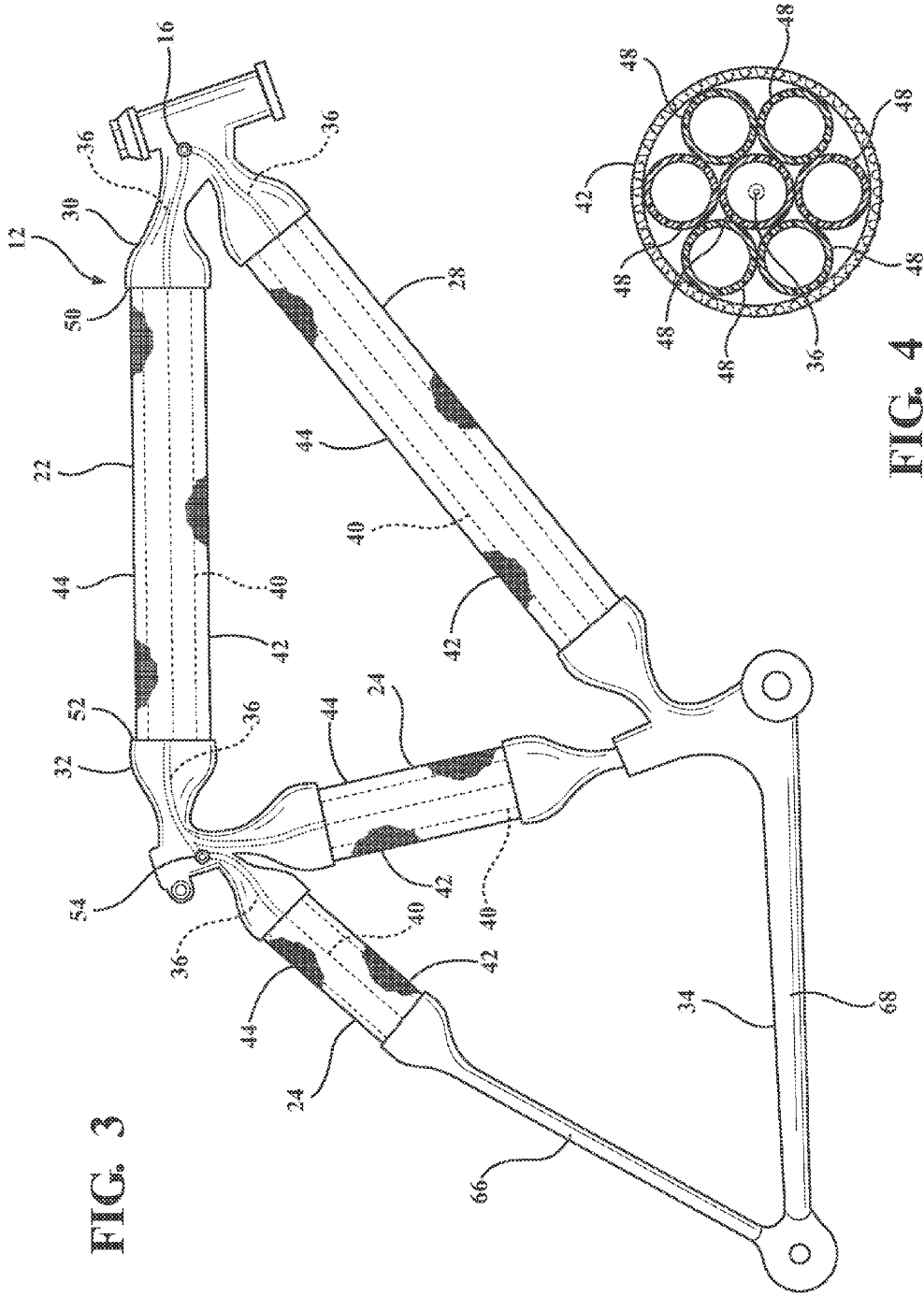

BICYCLE INCLUDING FRAME WITH INFLATABLE SEGMENTS

BACKGROUND

Bicycles are often transported with vehicles for use at various destinations. Packaging bicycles in or on a vehicle during transportation creates difficulties, especially with relatively small vehicles. An interior of a vehicle may be reconfigurable, e.g., seats may be folded, to accommodate a bicycle in the interior of the vehicle. However, the bicycle disadvantageously consumes valuable interior space of the vehicle and can disadvantageously move within the vehicle during unexpected acceleration or deceleration.

Bicycles can alternatively be stored on an exterior of a vehicle during transportation. For example, after-market racks are available for mounting to vehicles and supporting one or more bicycles. However, these after-market racks are expensive to purchase. Assembly of the after-market rack to the vehicle and assembly of the bicycle onto the rack is also disadvantageously time consuming. The rack and the bicycle also disrupts airflow around the vehicle during travel, thereby disadvantageously decreasing fuel economy of the vehicle. Accordingly, there remains an opportunity to design a bicycle that is capable of easily and compactly stored.

BRIEF DESCRIPTION OF THE DRAWINGS

FIG. 3 is a side view of the frame of the bicycle;

FIG. 4 is a cross-sectional view of one of the inflatable segments;

DETAILED DESCRIPTION

Figure 6:
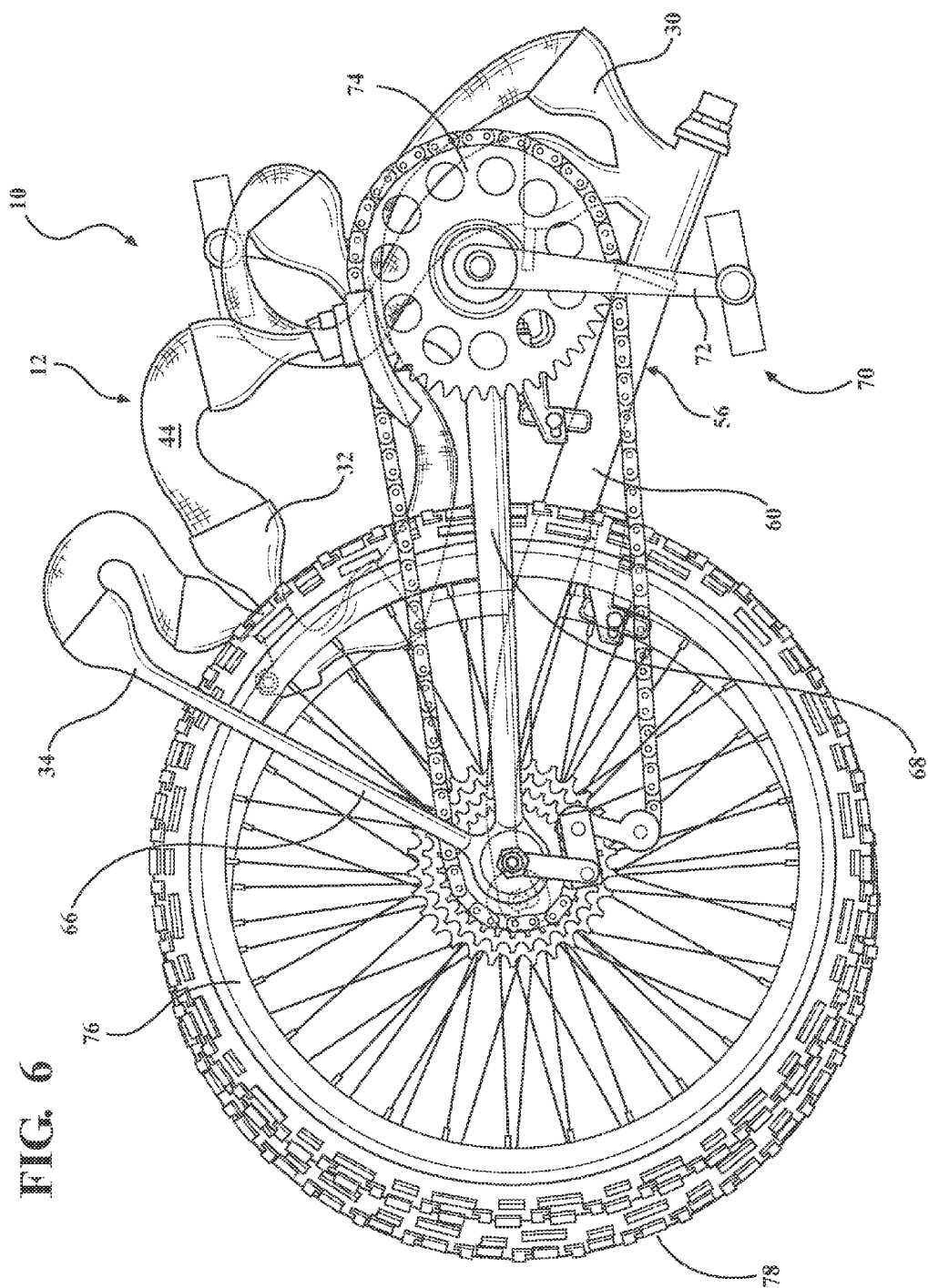
FIG. 6 is a side view of the bicycle with the inflatable segments deflated and packaged for storage.
Figure 7:
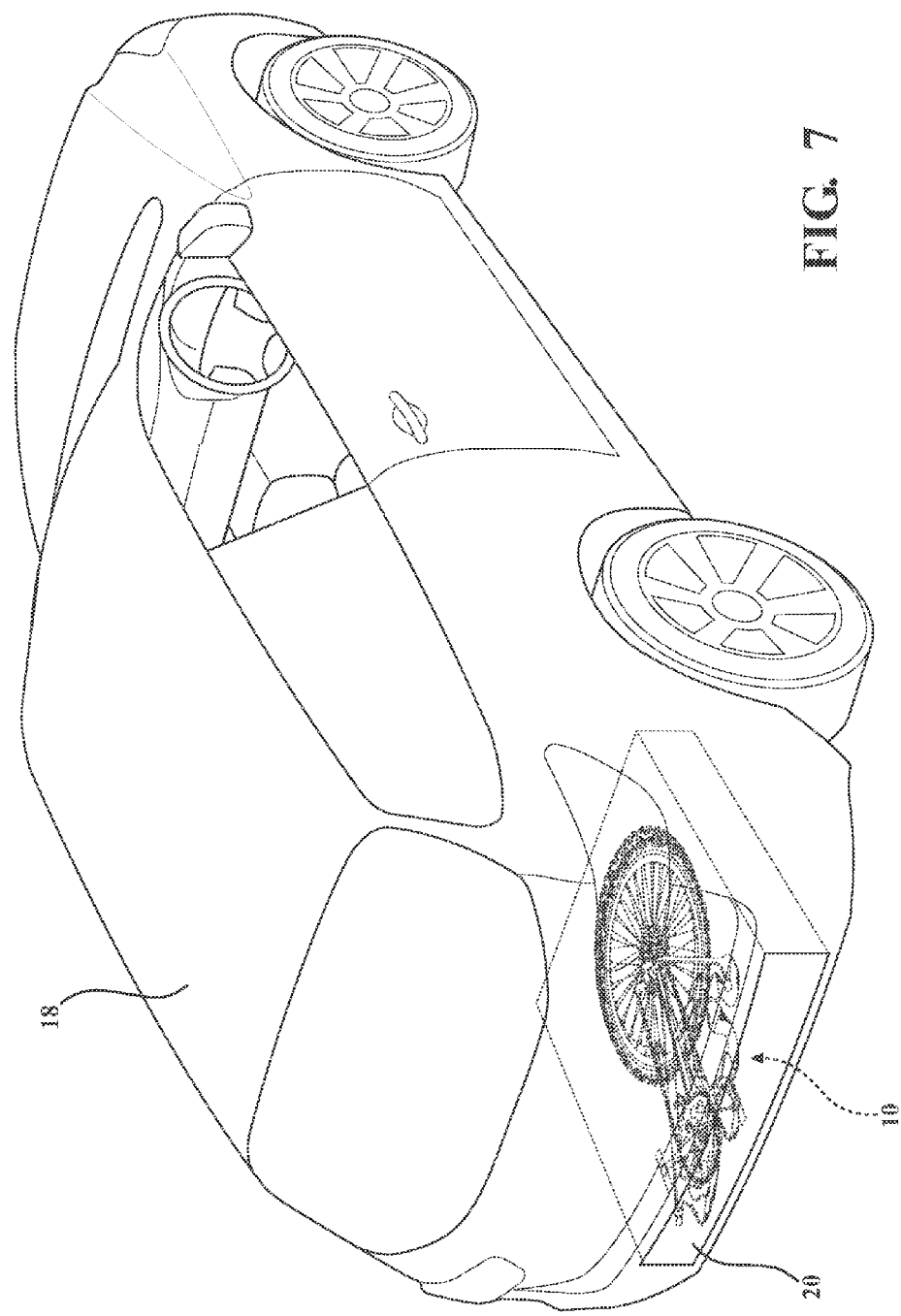
FIG. 7 is a rear view of a vehicle and the bicycle packaged for storage in the vehicle.

With reference to the Figures, wherein like numerals indicate like parts throughout the several views, a bicycle 10 includes a frame 12 having an inflatable segment 22, 24, 26, 28 and an input valve 16 in communication with the inflatable segment 22, 24, 26, 28 for selectively inflating and deflating the inflatable segment 22, 24, 26, 28. As described further below, the inflatable segment 22, 24, 26, 28 of the frame 12 can be inflated or deflated to a selected pressure to tune the suspension characteristics of the frame 12. As also described further below, the inflatable segment 22, 24, 26, 28 of the frame 12 can be deflated and folded for storage, as shown in FIG. 6. For example, when the frame 12 is deflated and folded, the bicycle 10 can be stored in a compartment 20 of a vehicle 18, as shown in FIG. 7. The vehicle 18 may be easily retrofitted to include the compartment 20 to store the bicycle 10.

The inflatable segment 22, 24, 26, 28 is configured to be flexible when deflated so that, for example, the frame 12 can be folded for storage, as shown in FIG. 6. When inflated, the inflatable segment 22, 24, 26, 28 is sufficiently rigid, as shown in FIGS. 1 and 2, to support the weight of an occupant of the bicycle 10 during operation of the bicycle 10.

Figure 1:
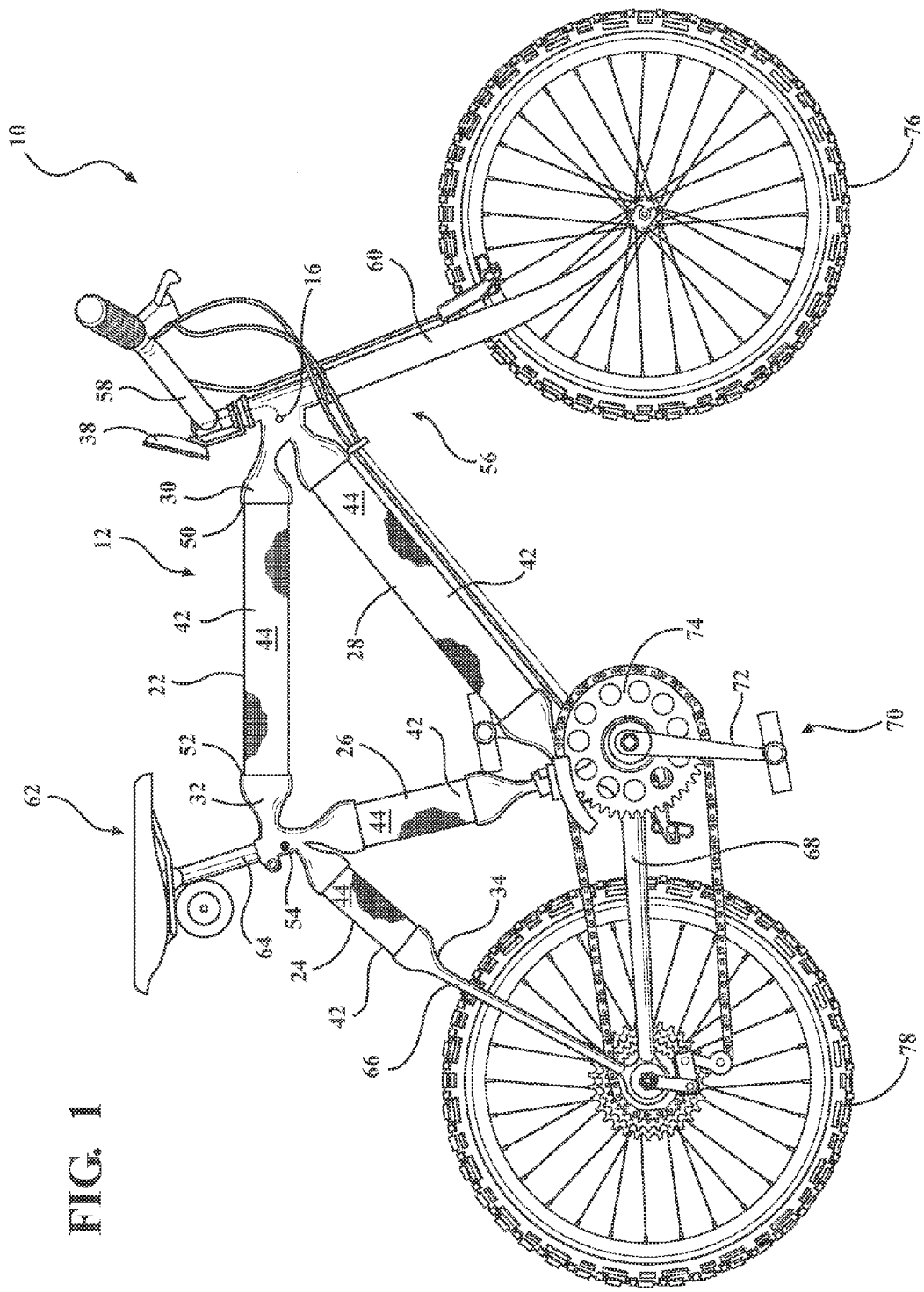
FIG. 1 is side view of a bicycle including a frame that includes inflatable segments.
Figure 2:
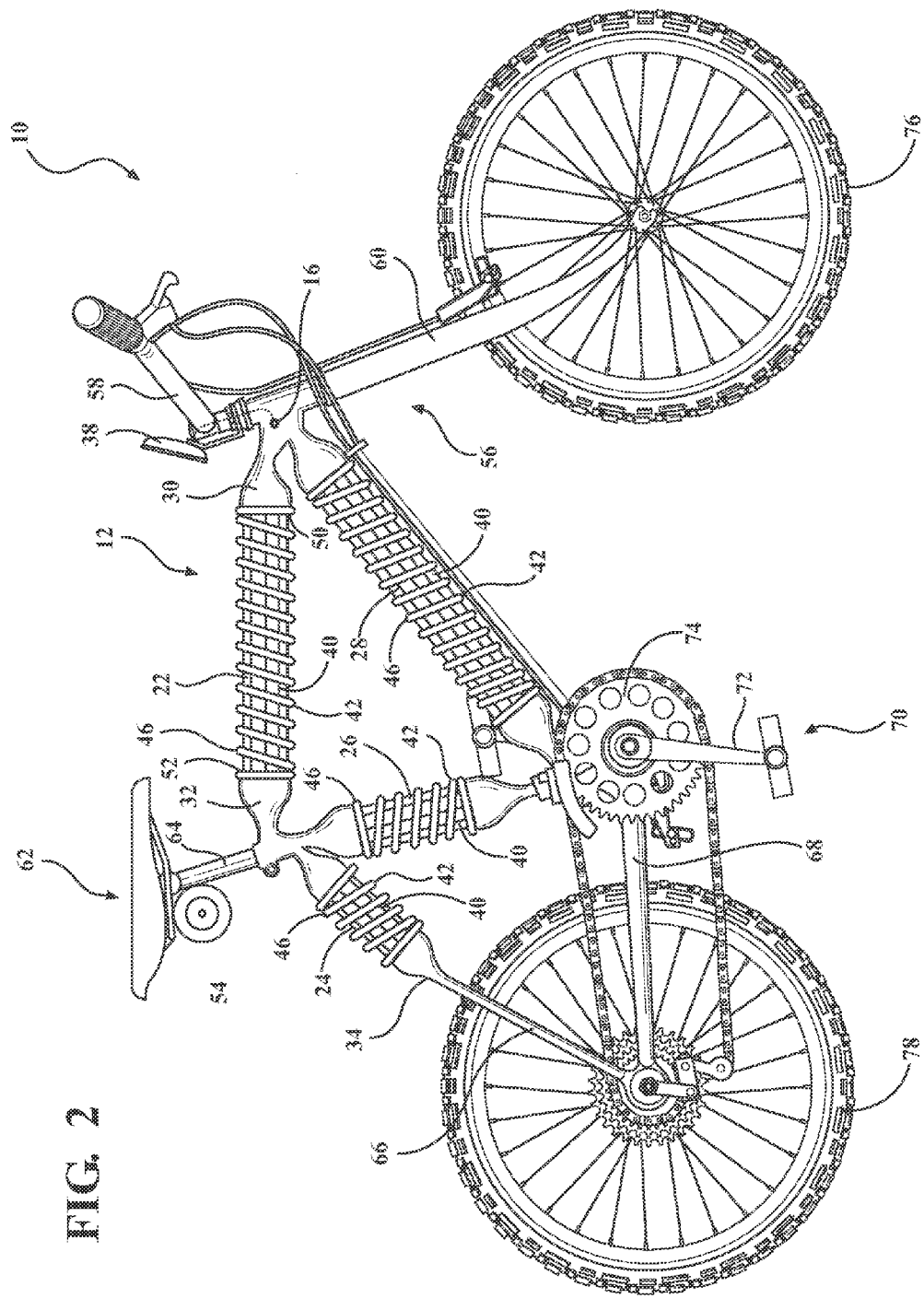
FIG. 2 is a side view of a bicycle including a frame that includes a different embodiment of inflatable segments.

The frame 12 may include a plurality of inflatable segments 22, 24, 26, 28, as shown in FIGS. 1-3. The frame 12 shown in FIGS. 1-3, for example, has four inflatable segments 22, 24, 26, 28 spaced from each other, namely a first inflatable segment 22 positioned as what is referred to in the art as a "top tube 48," a second inflatable segment 24 positioned as what is referred to in the art as a "seatstay," a third inflatable segment 26 positioned as what is referred to in the art as a "seat tube 48," and a fourth inflatable segment 28 positioned as what is referred to in the art as a "down tube 48." Alternatively, the frame 12 can include any number of inflatable segments 22, 24, 26, 28, e.g., one or more. Each of the inflatable segments 22, 24, 26, 28 may be of similar material and similar construction.

With reference to FIGS. 1-3, the frame 12 includes at least one rigid segment 30, 32, 34 that is connected to the inflatable segments 22, 24, 26, 28 and is rigid relative to the inflatable segments 22, 24, 26, 28 when the inflatable segments 22, 24, 26, 28 are deflated. Specifically, as shown in FIGS. 1-3, the frame 12 includes a plurality of rigid segments 30, 32, 34. For example, with reference to FIGS. 1-3, the frame 12 includes a first rigid segment 30, a second rigid segment 32, and a third rigid segment 34. Alternatively, the frame 12 can include any number of rigid segments 30, 32, 34, e.g., one or more. The rigid segment 30, 32, 34 supports other components of the bicycle 10, as set forth further below.

The rigid segments 30, 32, 34 are rigid relative to the inflatable segments 22, 24, 26, 28 when the inflatable segments 22, 24, 26, 28 are deflated. The rigid segments 30, 32, 34 can be formed of any suitable material such as, for example, carbon. Other examples of suitable material for the rigid segments 30, 32, 34 are metals such as titanium, aluminum, steel, etc.

With reference to FIG. 3, the inflatable segments 22, 24, 26, 28 are connected to each other. For example, hoses 36 connect the inflatable segments 22, 24, 26, 28. The hoses 36 may be housed in the rigid segments 30, 32, 34 and extend between inflatable segments 22, 24, 26, 28 within the rigid segments 30, 32, 34.

The input valve 16 is in communication with the inflatable segments 22, 24, 26, 28 for selectively inflating and deflating the inflatable segments 22, 24, 26, 28. The input valve 16, for example, is supported on the first rigid segment 30 and is connected with the first inflatable segment 22 and the fourth inflatable segment 28 through hoses 36. The input valve 16 is in communication with the second inflatable segment 24 and the third inflatable segments 22, 24, 26, 28 through the first inflatable segment 22 and associated hoses 36. Alternatively, the input valve 16 can be supported by any element of the bicycle 10 and can be connected with the inflatable segments 22, 24, 26, 28 in any configuration. The frame 12 may include multiple input valves 16. For example, the frame 12 may include a separate input valve 16 for each inflatable segment 22, 24, 26, 28, i.e., one input valve 16 per inflatable segment 22, 24, 26, 28.

The input valve 16 may be of any type. As one example, the input valve 16 may be a Schrader valve. The bicycle 10 may be inflated with any suitable source of compressed air. For example, the vehicle 18 may include an air compressor (not shown) for use with the input valve 16 to inflate the inflatable segments 22, 24, 26, 28. Alternatively, or in addition, the bicycle 10 may include an air cartridge such as a CO2 cartridge, a pump, etc., for use with the input valve 16 to inflate the inflatable segments 22, 24, 26, 28.

The input valve 16 may include a pressure sensor for monitoring the pressure of the first inflatable segment 22. In the event that the pressure in the inflatable segments 22, 24, 26, 28 increases beyond a desirable level, e.g., as a result of heating, the pressure sensor may communicate with a controller 38 of the bicycle 10, which is discussed further below, and/or may instruct a control on the input valve 16 to release air to achieve a desired pressure. In the event that the pressure in the inflatable segments 22, 24, 26, 28 decreases below a desirable lever, e.g., as a result of cooling, leak, etc., the pressure sensor may communicate with the controller 38 of the bicycle 10.

Each inflatable segment 22, 24, 26, 28 includes an elastic member 40 configured to be inflated and a restraining element 42 disposed about the elastic member 40 to restrain inflation of the elastic member 40. The elastic member 40 is elastically expandable when inflated. The elastic member 40 may be any suitable material, such as rubber, for example.

The restraining element 42 is substantially inelastic to control the direction and shape of inflation of the elastic member 40. The restraining element 42 may be disposed on an exterior of the inflatable segment 22, 24, 26, 28, as shown in FIGS. 1 and 2 to apply a compressive force to the elastic member 40 to restrain inflation of the elastic member 40 or, alternatively, may be disposed on an interior of the inflatable segment 22, 24, 26, 28 to restrain inflation. For example, the elastic member 40 may elastically inflate to fill the interior of the restraining element 42.

One embodiment of the restraining element 42 is shown in FIGS. 1 and 3-7. Another embodiment of the restraining element 42, for example, is shown in FIG. 2. With reference to FIG. 1, the restraining element 42 is a sleeve 44. The sleeve 44 may be disposed on the exterior of the inflatable segment 22, 24, 26, 28. The sleeve 44 may be, for example, an aramid fiber. For example, the aramid fiber may be Kevlar®. Alternatively, the sleeve 44 may be any suitable fabric with directional weaving. The sleeve 44 may be separate from the elastic member 40 or may be integral with the elastic member 40, i.e., fixed together as a one-piece unit.

With reference to FIG. 2, the restraining element 42 is a wire 46 extending around the exterior of the elastic member 40. The wire 46 may have any suitable size and shape and may be of any suitable material that is foldable when the elastic member 40 is deflated. The wire 46 may be, for example, in a spiral shape about the exterior of the elastic member 40, as shown in FIG. 2. Alternatively, for example, the wire 46 may be a mesh (not shown) about the exterior of the elastic member 40. The wire 46 can be of any suitable material. The wire 46 may be, for example, a metal such as steel. Alternatively, for example, the wire 46 may be carbon fiber, fluorocarbon, monofilament, etc. The wire 46 may be separate from the elastic member 40 or may be integral with the elastic member 40, i.e., fixed together as a one-piece unit.

In addition to or in the alternative to the sleeve 44 or the wire 46, the restraining member 42 may be fibers integral with the elastic member 40, i.e. fixed together as a one piece unit. In other words, the inflatable members 22, 24, 26, 28 are fiber-reinforced inflatable members. The fibers, for example, may be carbon fiber, fiber glass, aramid fibers, etc.

The elastic member 40 may include a plurality of tubes 48. For example, with reference to FIG. 4, the elastic member 40 includes seven tubes 48 with six tubes 48 disposed circumferentially an inner tube 48. Alternatively, the elastic member 40 may include any suitable number of tubes 48, i.e., one or more.

In a configuration where the elastic member 40 includes more than one tube 48, the tubes 48 may be fixed in position relative to each other. For example, the tubes 48 may be fastened to each other with an adhesive, Velcro®, etc.

In a configuration where the elastic member 40 includes more than one tube 48, the interiors of the tubes 48 may be in communication with each other so that each tube 48 is inflated to a common pressure. A manifold (not shown), for example, may connect the tubes 48.

Each inflatable segment 22, 24, 26, 28 extends longitudinally between a first end 50 and a second end 52. The first end 50 of each inflatable segment 22, 24, 26, 28 is received by and fixed to one of the rigid segments 30, 32, 34 and the second end 52 of each inflatable segment 22, 24, 26, 28 is received by and fixed to another of the rigid segments 30, 32, 34. As one example, the first end 50 of the first inflatable segment 22 is received by and fixed to the first rigid segment 30 and the second end 52 of the first inflatable segment 22 is received by and fixed to the second rigid segment 32.

The first end 50 and the second end 52 of each inflatable segment 22, 24, 26, 28 is fixed to the respective rigid segment 30, 32, 34 in any suitable manner. For example, the inflatable segments 22, 24, 26, 28 may be fixed to the rigid segments 30, 32, 34 with an adhesive.

A valve 54 may be disposed between two inflatable segments 22, 24, 26, 28 to selectively inflate or deflate the two inflatable segments 22, 24, 26, 28 to a different pressure. The valve 54 connects at least one of the inflatable segments 22, 24, 26, 28 from at least one other inflatable segment 22, 24, 26, 28 and the input valve 16. The valve 54 is moveable between an open position and a closed position. The valve 54 is opened to the open position to allow communication across the valve 54, i.e., to allow fluid communication between the inflatable segments 22, 24, 26, 28, and is closed to the closed position to prevent communication across the valve 54, i.e., to prevent fluid communication between the inflatable segments 22, 24, 26, 28. The valve 54 may be selectively opened and closed to tune suspension characteristics of the frame 12, as set forth further below.

For example, as shown in FIG. 3, the valve 54 is disposed between the first inflatable segment 22 and the second inflatable segment 24. As set forth above, the input valve 16 is connected to the first inflatable segment 22. As such, the valve 54 selectively separates the second inflatable segment 24 from the first inflatable segment 22 and the input valve 16. The second inflatable segment 24 is airtight when the valve 54 is closed. During inflation of the first inflatable segment 22 through the input valve 16, the valve 54 can be opened, such that the second inflatable segment 24 is inflated to the same pressure as the first inflatable segment 22. Alternatively, during inflation of the first inflatable segment 22 through the input valve 16, the valve 54 can be closed during the inflation such that the second inflatable segment 24 is inflated to a lower pressure than the first inflatable segment 22.

The valve 54 may be configured to be manually operated. For example, the valve 54 may include a lever or a button to move the valve 54 between the open position and the closed position. Alternatively, the valve 54 may be controlled by an Interactive Command Cluster (ICC) (not shown) of the vehicle 18, as set forth further below.

In the frame 12 shown in FIG. 3, the third inflatable segment 26 and the fourth inflatable segment 28 are each connected to the first inflatable segment 22 with tubes 48 such that the first inflatable segment 22, the third inflatable segment 26, and the fourth inflatable segment 28 are inflated to the same pressure. Alternatively, valves similar to the valve 54 may be disposed between any of the inflatable segments 22, 24, 26, 28 to selectively close communication between any one or more of the first inflatable segment 22, the second inflatable segment 24, the third inflatable segment 26, and the fourth inflatable segment 28.

The bicycle 10 includes a front steering assembly 56 rotatably coupled to the frame 12. The front steering assembly 56 includes a handle bar 58 and a fork 60 coupled to the handle bar 58. The handle bar 58 and the fork 60 rotate together as a unit relative to the frame 12. The front steering assembly 56 is rotatably supported by the first rigid segment 30. The first rigid segment 30 may, for example, define a bore (not shown) that rotatably receives at least one of the handle bar 58 and the front steering assembly 56.

The bicycle 10 includes a seat 62 supported by the rigid segments 30, 32, 34. In particular, the second rigid segment 32 receives and supports the seat 62. The second rigid segment 32 may define, for example, a bore that removeably receives a post 64 of the seat 62. The seat 62 may, for example, also be used as a headrest in the vehicle 18.

The third rigid segment 34 includes an upper portion 66 and a lower portion 68 with the upper portion 66 and the lower portion 68 defining a V-shape. A pedal assembly 70 may be supported on the lower portion 68 of the third rigid segment 34. The pedal assembly 70, for example, may include crankarm 72s, a gear cassette 72, etc., for pedaling the bicycle 10.

The bicycle 10 includes a front wheel 76 and a rear wheel 78. In particular, the front wheel 76 is rotatably coupled to the front steering assembly 56 and the rear wheel 78 is rotatably coupled to the third rigid segment 34. The second inflatable segment 24 extends between the seat 62 and the rear wheel 78 and specifically from the second rigid segment 32 to the third rigid segment 34. As set forth above, the second inflatable segment 24 may be inflated to a lower pressure than the first inflatable segment 22, third inflatable segment 26, and fourth inflatable segment 28 to tune the suspension characteristics of the frame 12. In other words, the second inflatable segment 24 may be inflated to a desired level to tune shock absorption and rebound of the second inflatable segment 24 between the seat 62 and the rear wheel 78.

The bicycle 10 may include a motor (not shown) coupled to at least one of the front wheel 76 and the rear wheel 78 for propulsion. For example, the bicycle 10 may include a battery (not shown) connected to the motor to power the motor. In other words, the bicycle 10 may be an e-bike. The motor can be of any type. For example, the motor can be incorporated on the front wheel 76 or the rear wheel 78 such as in the wheel commercially available under the name "Smart Wheel" by FlyKly, Inc. The bicycle 10 may include an anti-lock braking system.

As set forth above, the bicycle 10 may be stored in a vehicle 18 when the inflatable segments 22, 24, 26, 28 of the frame 12 are deflated, as shown in FIG. 7. The vehicle 18 and the bicycle 10 each include a connector (not shown) that allows for connection between the frame 12 of the bicycle 10 and the ICC of the vehicle 18 when the bicycle 10 is stored in the vehicle 18. The vehicle 18 may include the compartment 20, for example, a drawer unit that stores the bicycle 10, as shown in FIG. 7. Alternatively, the compartment 20 may be a drop tray (not shown) hidden below the vehicle 18. Operation of the drawer unit may be manual or automatic, for example, with the use of the ICC. The ICC may, for example, open and close the compartment 20. In addition or in the alternative, the compartment 20 may be opened with a foot activated sensor for a hands-free operation.

The ICC of the vehicle 18 may include, for example, an interactive screen in communication with a computer for monitoring and adjusting various parameters of the performance, entertainment features, etc., of the vehicle 18. The ICC may communicate with sensors or computers supported on the bicycle 10 that monitor speed and distance of travel of the bicycle 10 during use, battery life for the motor, etc. The ICC may visually display these measurements.

The bicycle 10 may include the controller 38, as set forth above, for controlling performance of the bicycle 10 and/or recording data from the bicycle 10 such as operating data, environmental data, etc. The controller 38, for example, may be a smart cell phone that an operator can removeably engage with the bicycle 10. Alternatively, for example, the controller 38 may be a computer permanently fixed to the bicycle 10. In any event, the controller 38 may be connected with the ICC to communicate recorded data to the ICC. The controller 38 may display information communicated from other components of the bicycle 10. For example, the controller 38 may display pressure monitored by the pressure sensor on the input valve 16 and/or may display alerts when pressure reaches an upper threshold or a lower threshold.

The controller 38 of the bicycle 10 may include anti-theft provisions, e.g., the bicycle 10 is immobile when the controller 38 is not connected. The controller 38 may provide route planning and may provide guidance on energy consumption based on topologic information to maximize range.

When removed from the vehicle 18, the inflatable segments 22, 24, 26, 28 of the frame 12 are inflated through the input valve 16 in communication with the inflatable segment 22, 24, 26, 28. The inflatable segments 22, 24, 26, 28 of the frame 12 are inflated by connecting the valve 54 to a pressurized air source to inflate the inflatable segments 22, 24, 26, 28. The air source may be, for example, an air compressor of the vehicle 18, as set forth above.

During inflation, the suspension characteristics of the frame 12 may be tuned by selectively closing the valve 54 connecting the first inflatable segment 22 and the second inflatable segment 24. Specifically, during inflation, the first inflatable segment 22 and the second inflatable segment 24 are initially inflated simultaneously. When the second inflatable segment 24 reaches a desired pressure, the valve 54 is closed to disconnect the second inflatable segment 24 from the first inflatable segment 22 and the input valve 16. After the valve 54 is closed, the first inflatable segment 22 is further inflated.

As set forth above, the third inflatable segment 26 and the fourth inflatable segment 28 are open to the first inflatable segment 22 and, as such, the third inflatable segment 26 and the fourth inflatable segment 28 are inflated simultaneously and to the same pressure as the first inflatable segment 22. Alternatively, as set forth above, additional valves may separate each of the inflatable segments 22, 24, 26, 28, in which case the valves may be selectively closed to independently tune the inflatable segments 22, 24, 26, 28.

The valve 54 may be operated manually between the opened position and the closed position. Alternatively, the valve 54 may be operated automatically between the open and closed position. For example, the ICC of the vehicle 18 can control the operation of the valve 54 to selectively tune the suspension characteristics of the frame 12 based on user input to the ICC.

Figure 5:
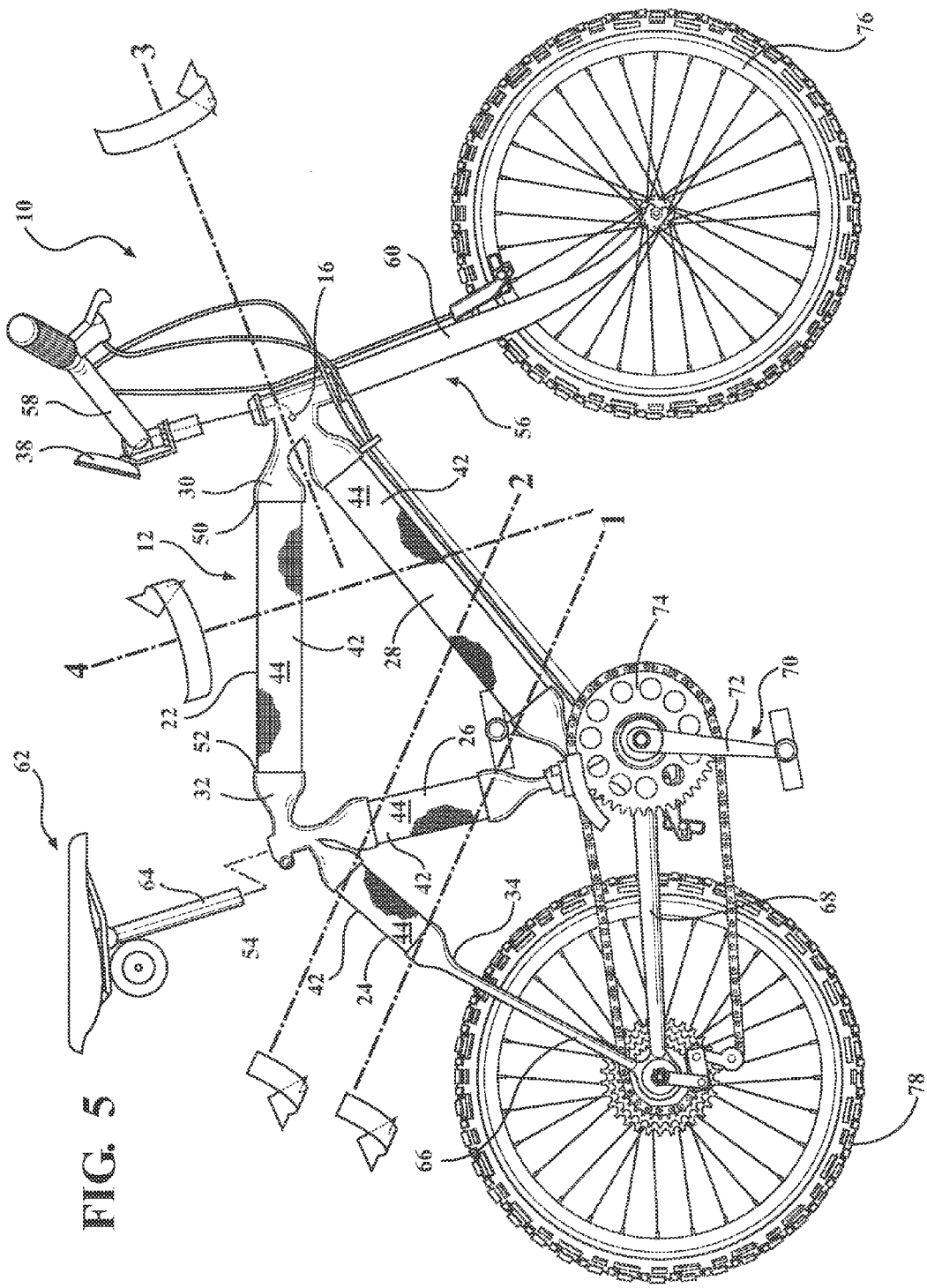
FIG. 5 is a side view of the bicycle with the line about which the frame is moved for packaging for storage when the inflatable segments are deflated.

When the bicycle 10 is removed from the vehicle 18, before or after inflation of the inflatable segments 22, 24, 26, 28, components of the bicycle 10 may be assembled. For example, as shown in FIG. 5, the handle bar 58 and the seat 62 may be removeably assembled for storage in the vehicle 18. During assembly, the handle bar 58 may assembled to the fork 60 and the seat 62 may be assembled with the second rigid segment 32 of the frame 12. The front wheel 76 and the rear wheel 78 may also be removeably assembled. In such instances, the front wheel 76 may be assembled to the fork 60 of the steering assembly. The rear wheel 78 may be assembled to the third segment of the frame 12. Alternatively, the bicycle 10 may be fully assembled while deflated and stored in the vehicle 18.

As set forth above, operating and/or environmental data is monitored and/or displayed on the controller 38. For example, the pressure in the inflatable segment 22, 24, 26, 28 is monitored, for example, with the pressure sensor on the input valve 16. Other data includes minimum/maximum speed, battery life, distance travelled, etc.

When the bicycle 10 is to be stored, the inflatable segments 22, 24, 26, 28 of the frame 12 are deflated through the valve 54. With reference to FIG. 6, once deflated, the second inflatable segment 24, third inflatable segment 26, and fourth inflatable segment 28 are folded along line A and then along line B. The second inflatable segment 24, third inflatable segment 26, and fourth inflatable segment 28 bulge when folded along line A and line B. The first rigid segment 30 is then twisted about line C. The first inflatable segment 22 and the fourth inflatable segment 28 are then folded along line D.

Prior to or after folding, components of the bicycle 10 may be disassembled for storage. For example, the seat 62 and the handle bar 58 may be removed as shown in FIG. 5.

The folded frame 12 is shown in FIG. 6, for example, and the folded frame 12 may be placed in the compartment 20 of the vehicle 18, as shown in FIG. 7. When stored in the vehicle 18, the bicycle 10 may be connected to the vehicle 18, e.g., through connectors on the bicycle 10 on the vehicle 18. For example, the bicycle 10 may be connected to the ICC of the vehicle 18. In addition, or in the alternative, the bicycle 10 may be connected to a battery of the vehicle 18 to charge a battery on the bicycle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A bicycle comprising:
   a frame;
   a front steering assembly rotatably coupled to the frame;
   a front wheel rotatably coupled to the front steering assembly; and
   a rear wheel rotatably coupled to the frame;
   the frame including an inflatable segment and a valve in communication with the inflatable segment for selectively inflating and deflating the inflatable segment;
   wherein the inflatable segment is positioned to form at least part of at least one of a top tube or a down tube, the inflatable segment is configured to be flexible when deflated so that the frame can be folded for storage, the inflatable segment, when inflated, is sufficiently rigid to support the weight of an occupant of the bicycle during operation of the bicycle.

2. The bicycle as set forth in claim 1 wherein the inflatable segment includes an elastic member configured to be inflated and a restraining element disposed about the elastic member to restrain inflation of the elastic member.

3. The bicycle as set forth in claim 2 wherein the restraining element is a sleeve.

4. The bicycle as set forth in claim 2 wherein the restraining element is a wire extending around an exterior of the elastic member.

5. The bicycle as set forth in claim 2 wherein the elastic member includes a plurality of tubes with the restraining element retaining the elastic tubes.

6. The bicycle as set forth in claim 1 further comprising a second inflatable segment spaced from the inflatable segment and a rigid segment that couples the inflatable segment and the second inflatable segment, the rigid segment being rigid relative to the inflatable segment and the second inflatable segment.

7. The bicycle as set forth in claim 6 further comprising a hose connecting the inflatable segment and the second inflatable segment.

8. The bicycle as set forth in claim 7 further comprising another valve between the inflatable segment and the second inflatable segment.

9. The bicycle as set forth in claim 8 further comprising a seat, the second inflatable segment extending between the seat and the rear wheel.

10. The bicycle as set forth in claim 1 wherein the inflatable segment extends longitudinally between a first end and a second end and wherein the frame includes a first rigid segment receiving and fixed to the first end and a second rigid segment receiving and fixed to the second end, the first rigid segment and the second rigid segment being rigid relative to the inflatable segment.

11. The bicycle as set forth in claim 1 wherein the steering assembly includes a handle bar and a fork coupled to the handle bar and receiving the front wheel.

12. The bicycle as set forth in claim 1 further comprising a plurality of rigid segments and at least one other inflatable segment with each inflatable segment extending between two of the rigid segments, the rigid segments being rigid relative to the inflatable segments and supporting the front steering assembly and the rear wheel.

13. The bicycle as set forth in claim 12 further comprising a seat supported by the rigid segments.

14. The bicycle as set forth in claim 1 further comprising a motor coupled to at least one of the front wheel and the rear wheel for propulsion.

15. A method of using a bicycle including a frame, a front steering assembly rotatably coupled to the frame, a front wheel rotatably coupled to the front steering assembly and a rear wheel rotatably coupled to the frame, wherein the frame includes an inflatable segment and a valve in communication with the inflatable segment for selectively inflating and deflating the inflatable segment, wherein the inflatable segment is positioned to form at least part of at least one of a top tube or a down tube, the inflatable segment is configured to be flexible when deflated so that the frame can be folded for storage, the inflatable segment, when inflated, is sufficiently rigid to support the weight of an occupant of the bicycle during operation of the bicycle, the method comprising:
   assembling a seat to the frame of the bicycle;
   assembling the front wheel to the front steering assembly of the bicycle;
   assembling the rear wheel to the frame of the bicycle; and
   inflating the inflatable segment of the frame of the bicycle through the valve in communication with the inflatable segment.

16. The method as set forth in claim 15 further comprising closing the valve connecting the inflatable segment and another inflatable segment of the frame during inflation to tune suspension characteristics of the frame.

17. The method as set forth in claim 15 further comprising monitoring pressure in the inflatable segment.

18. A method of storing a bicycle including a frame, a front steering assembly rotatably coupled to the frame, a front wheel rotatably coupled to the front steering assembly and a rear wheel rotatably coupled to the frame, wherein the frame includes an inflatable segment and a valve in communication with the inflatable segment for selectively inflating and deflating the inflatable segment, wherein the inflatable segment is positioned to form at least part of at least one of a top tube or a down tube, the inflatable segment is configured to be flexible when deflated so that the frame can be folded for storage, the inflatable segment, when inflated, is sufficiently rigid to support the weight of an occupant of the bicycle during operation of the bicycle, the method comprising:

deflating the inflatable segment of the frame of the bicycle through the valve in communication with the inflatable segment; and folding the inflatable segment after deflation for storage.

19. The method as set forth in claim 18 further comprising placing the bicycle in a compartment of a vehicle.

20. The method as set forth in claim 19 further comprising connecting a battery of the bicycle to a power source of the vehicle.

\* \* \* \* \*